ial usually account for 85% by weight or more of the ink formulations. The balance is made up of minor amounts of components which improve the stability and quality of the inks as will appear from the following examples.

United States Patent Office 3,043,784
Patented July 10, 1962

3,043,784
ELECTRICALLY CONDUCTIVE PRINTING INK
Robert K. Remer, Elgin, Ill., assignor to Tribune Company, Chicago, Ill., a corporation of Illinois
No Drawing. Filed Dec. 22, 1958, Ser. No. 781,882
9 Claims. (Cl. 252—509)

My invention relates, generally, to new and improved printing ink compositions and methods of making the same. It relates more particularly to electrically conductive ink compositions containing a color material (e.g. carbon black, or colored pigments) and a lignin material intimately dispersed in a vehicle consisting essentially of a colloidal dispersion of oil (e.g. light mineral oil such as paraffin oil or kerosene) in water.

The present application is a continuation-in-part of my co-pending application Serial No. 748,863 filed July 16, 1958. In said application I have disclosed novel methods of printing involving the combined use of electrically conductive inks (either black or colored), and low-friction fountain knives and fountain rollers, the working surfaces of which are formed with, or carry, permanent solid type lubricants, and, depending upon the type of printing one or more of the following: low-friction press rollers formed of rubber or resilient rubber-like material the ink contacting or working surfaces of which are formed with or carry solid type lubricants; electrically conductive printing blankets; and, electrically conductive impression cylinders, such blankets and cylinders being electrically grounded.

The printing ink compositions of the present application are particularly suitable for use in my aforesaid printing processes, whereas, conventional non-conductive printing ink compositions, e.g. ordinary news ink, are not. For a complete description of my novel printing processes reference is made to my said co-pending application Serial No. 748,863.

An important object of my invention is the provision of an electrically conductive printing ink which costs only a few cents per pound and which is competitive in cost to conventional printing inks.

Another object of the invention is the provision of electrically conductive printing inks which may be readily manufactured at low cost from readily available ingredients using known apparatus.

A further object of the invention is the provision of electrically conductive printing ink compositions characterized by good shelf-life and stability, rapid drying, substantial freedom from strike-through, depth or blackness or color of the deposits, sharp and discrete dot formation without feathering, resistance to off-set, resistance to rub-off and wash-off, and ability to trap other ink dots.

Certain other objects of the invention will, in part, be obvious and will in part appear hereinafter.

For a more complete understanding of the nature and scope of this invention, reference may now be had to the following detailed description thereof including the illustrative examples given therein.

As stated above, the vehicle portion of my ink formulations is an emulsion or colloidal dispersion of oil in water. That is, the oil is the dispersed or discontinuous phase and water is the disperse or continuous phase. Carbon black, colored pigment or other color material, and a lignin material are intimately dispersed in such vehicle. The water, oil, color material and lignin material usually account for 85% by weight or more of the ink formulations. The balance is made up of minor amounts of components which improve the stability and quality of the inks as will appear from the following examples.

Example 1

An aqueous carbon black dispersion of the following composition is prepared:

Water _____kilograms__ 45.4
Sodium lignosulfonate powder (partially desulfonated if desired (e.g. Marasperse CB of Marathon
  Corp.) _____grams___ 1150
Carbon black (e.g. Raven 11 channel black)
                                                kilograms__ 11.3
Sulphur black hydrosol, water dispersible __grams__ 240

This aqueous dispersion is run for 30 minutes in a colloid mill, e.g. a Kady colloid mill, so as to obtain a fine grind, e.g. 7 on the Hedgeman scale. Using the above carbon black dispersion the following ink formulation is made:

Grams
Paraffin oil _____ 800
Petroleum sulfonate (oil-soluble, soda soap obtained
  in the treatment of mineral oil with strong sulfuric acid (e.g. Amoco AA of Standard Oil of
  Indiana)[1] _____ 30
Calcium lignosulfonate (evaporated calcium base
  sulfite waste liquor—50% solids) _____ 600
Polyoxyethylene glycol esters having an average
  mol. wt. of 718 and the general formula

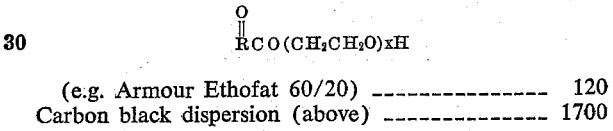

(e.g. Armour Ethofat 60/20) _____ 120
Carbon black dispersion (above) _____ 1700
Procedure:
  (1) Heat paraffin oil to 150° F.
  (2) Add petroleum sulfonate to oil and bring temperature to 180° F.
  (3) Adjust pH of calcium lignosulfonate to approximately 7 with alkali (e.g. NaOH, Ca(OH)$_2$ triethanolamine, or morpholine).
  (4) Add calcium lignosulfonate and Ethofat 60/20 and bring temperature to 200° F.
  (5) Add carbon black dispersion with stirring for approximately 10 minutes and discontinue heat.
  (6) Homogenize (e.g. one pass at 4000 p.s.i. through a double-stroke Gaulin-Maton homogenizer).
  (7) Chill to 72° F.

[1] The soda soap may be replaced by petroleum sulfonates neutralized with other bases, e.g. calcium hydroxide or triethanolamine.

Example 2

Same as Example 1 with 50 grams of glyoxal included in the carbon black dispersion.

Example 3

Same as Example 1 with 100 grams of polyvinylpyrrolidone (20% aqueous solution) or 100 grams of guar gum (20% aqueous solution) included in the carbon black dispersion.

Example 4

An aqueous carbon black dispersion prepared in accordance with Example 1 is used in the following ink formulation:

Grams
Paraffin oil _____ 800
Petroleum sulfonate (Amoco AA) _____ 200
Calcium lignosulfonate 50% solids, neutralized with
  morpholine _____ 800
Ethofat 60/20 _____ 40
Carbon black dispersion _____ 1400
Polyvinylpyrrolidone 20% solution (PVP 20%) __ 20

Procedure:
(1) Heat paraffin oil to 200° F.
(2) Add petroleum sulfonate with stirring.
(3) Add Ethofat 60/20 with stirring.
(4) Add calcium lignosulfonate with stirring.
(5) Add polyvinylpyrrolidone with stirring.
(6) The temperature is increased to 220° F. and maintained at this temperature for 20 minutes.
(7) Cool to 150° F.
(8) Add carbon black dispersion.
(9) Homogenize (e.g. one pass at 400 p.s.i. through a double-stroke Gaulin-Maton homogenizer).
(10) Chill to room temperature.

*Example 5*

A varnish of the following composition is prepared:

| | Grams |
|---|---|
| Calcium lignosulfonate 50% solids neutralized with morpholine | 2000 |
| Direct Deep Black EAC [1] (Ciba Co.) | 300 |
| Dicyandiamide (cyanoguanidine—the dimer of cyanamide) | 80 |
| Formaldehyde—30% | 50 |

Procedure:
(a) Heat calcium lignosulfonate to 200° F. in a reactor.
(b) Add black dye with stirring and react together for 20 minutes at 200° F.
(c) Add dicyandiamide.
(d) Add formaldehyde.
(e) React for 30 minutes at 200° F.

[1] May be replaced by any one of the following dyestuffs:

| Color Index Number | Dyestuff |
|---|---|
| 581 | Direct Deep Black EW Extra. |
| 582 | Direct Deep Black RW Extra. |
| 864 | Nigrosine Spirit Soluble. |
| 865 | Nigrosine. |
| 870 | Aniline Black. |
| 878 | Sulphur Black T Extra (the sodium salt of picramic acid). |
| 1102 | Anthra Black B. |

Using this varnish, the following ink formulation is made:

| | Grams |
|---|---|
| Paraffin oil | 800 |
| Petroleum sulfonate (Amoco AA) | 200 |
| Ethofat 60/20 | 40 |
| Polyvinylpyrrolidone 20% | 20 |
| Calcium lignosulfonate 50% solids, neutralized with morpholine | 800 |
| Varnish (above) | 1000 |

Procedure:
(1) Heat paraffin oil to 200° F.
(2) Add petroleum sulfonate with stirring.
(3) Add Ethofat 60/20 with stirring.
(4) Add calcium lignosulfonate with stirring.
(5) Add polyvinylpyrrolidone with stirring.
(6) Heat mixture to 220° F. and hold at this temperature for 15 minutes.
(7) Discontinue heat and add varnish with stirring.
(8) Homogenize as in Example 1.

The inks in the foregoing examples are all electrically conductive black inks. Electrically conductive color inks may be made according to the following examples:

*Example 6*

A pigment dispersion of the following composition is prepared:

| | Grams |
|---|---|
| Water | 700 |
| Sodium lignosulfonate powder as in Example 1 | 20 |
| Benzidine yellow press cake | 1100 |
| Pigment extender (e.g. calcium carbonate, clay or calcium silicate—Mirocel) | 200 |
| Calcium lignosulfonate (as in Example 1) | 200 |
| Polyvinylpyrrolidone (20% solution) | 10 |

Procedure:
(a) Add the water to a colloid mill.
(b) Add the sodium lignosulfonate with agitation.
(c) Add benzidine yellow press cake and mill for 20 minutes.
(d) Add extender pigment and mill for 20 minutes.
(e) Add calcium lignosulfonate and mill for 10 minutes.
(f) Add polyvinylpyrrolidone and mill for 20 minutes.

Using this pigment dispersion, the following ink formulation is made:

| | Grams |
|---|---|
| Paraffin oil (or mineral oil) | 800 |
| Petroleum sulfonate (Amoco AA) | 30 |
| Ethofat 60/20 | 120 |
| Calcium lignosulfonate (as in Example 1) | 400 |
| Above yellow pigment dispersion | 1700 |

Procedure:
(1) Heat the paraffin oil, petroleum sulfonate and Ethofat to 180° F.
(2) Add calcium lignosulfonate and heat for 10 minutes at 200° F.
(3) Add the yellow pigment dispersion with agitation.
(4) Run mixture through a homogenizer—one pass at 4000 p.s.i.

*Example 7*

To make a blue ink, follow Example 6 but substitute an equal amount of Milori Blue press cake for the Benzidine Yellow press cake.

*Example 8*

To make a red ink, follow Example 6 but substitute an equal amount of Barium Lithol Red press cake for the yellow pigment.

*Example 9*

The preparation of this preferred black news ink will be described after first giving its composition as follows:

A. Carbon black dispersion:

| | Grams |
|---|---|
| Water | 2400 |
| Sodium lignosulfonate powder (partially desulfonated if desired e.g. Marasperse CB) | 40 |
| Morpholine [1] | 24 |
| Dicyandiamide | 24 |
| Carbon black (e.g. Raven 11 channel black) | 360 |
| Capryl alcohol | 10 |
| | 2858 |

B. Lignosulfonate fraction:

| | Grams |
|---|---|
| Calcium lignosulfonate (evaporated calcium base sulfite waste liquor—50% solids—neutralized to approximately 7 with alkali (e.g. NaOH, Ca(OH)$_2$, triethanolamine, morpholine, etc.) | 3000 |
| Carbon black (Raven 11) | 300 |
| Capryl alcohol | 5 |
| Dicyandiamide | 120 |
| Morpholine | 10 |
| | 3435 |

C. Fraction:

| | Grams |
|---|---|
| Water | 1000 |
| Igepal CO-990 [2] (surfactant) | 150 |

| | |
|---|---:|
| Boric oxide | 30 |
| Dicyandiamide | 112 |
| Glycerol monohydroxy stearate³ (defoamer) | 10 |
| | 1302 |

D. Fraction:

| | |
|---|---:|
| Glyoxal | 240 |
| Formaldehyde | 150 |
| | 390 |

E. Oil fraction:

| | |
|---|---:|
| Deodorized kerosene | 3000 |
| Paraffin oil | 1000 |
| Petroleum sulfonate (e.g. Amoco AA) | 250 |
| Polyvinylpyrrolidone⁴ (PVP) | 125 |
| Igepal CO–430² | 100 |
| | 4475 |

¹ The morpholine may be replaced by 3-methoxy propylamine.

² Igepal CO surfactants are polyoxyethylated nonylphenols made by chemical reaction of nonylphenol with different amounts of ethylene oxide.

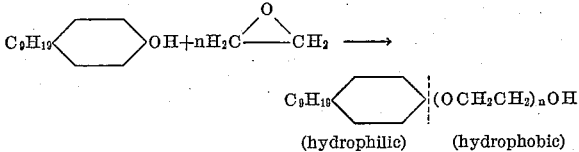

(hydrophilic)   (hydrophobic)

| Product | "n" | Percent ethylene oxide |
|---|---:|---:|
| Igepal CO–430 | 4 | 44 |
| Igepal CO–990 | 40 | 96 |

³ This may be replaced by Nopco 1497 (National Oil Products Co., Harrison, N.J.) described in Patent 2,346,928.

⁴ May be replaced by an equal amount of other protective colloids soluble in kerosene at 120° F., e.g. Du Pont's Alkanol DOA polymeric dispersant.

A. *Carbon black dispersion.*—The 2400 grams of water is put into a colloid mill, e.g. a Kady mill. Then there is added the 40 grams of Marasperse CB, 24 grams of morpholine, 24 grams of dicyandiamide, 360 grams of Raven 11, and 10 grams capryl alcohol. This mixture is run in the Kady mill for approximately 1 hour. The resulting dispersion may be stored until ready for use.

B. *Lignosulfonate fraction.*—This solution is also prepared in the Kady mill. The calcium lignosulfonate is put in first. The 5 grams capryl alcohol (defoamer) are added next, the Kady mill being operated all this time. The third ingredient to be added is the 10 grams of morpholine. Next 120 grams of dicyandiamide are added and last the 300 grams of Raven 11. These ingredients can be added to the Kady mill in succession without any waiting period between. After all of the ingredients are added then the batch is run in the Kady mill for from 30 and 60 minutes. The resulting solution may be stored until ready for use.

C. *Fraction.*—This mixture is prepared separately in a container or vessel equipped with an agitator and heating means. The 1000 grams of water is introduced first and then the other ingredients are added in the order and amounts listed, i.e. 150 grams of Igepal CO–990, 30 grams of boric oxide, 112 grams of dicyandiamide, and 10 grams of the defoamer. The agitated mixture is preheated to approximately 160 F. The order of addition is not critical.

The carbon black dispersion A and the lignosulfonate fraction B are introduced either together or separately into a jacketed reactor equipped with an agitator and adapted to be closed so as to operate under sufficient pressure to prevent boiling or loss of constituents. A pressure of 5 p.s.i.g. is satisfactory. With the carbon black dispersion A and the lignosulfonate solution B in the reactor and being agitated, C-fraction is added and the reactor closed and the contents are reacted for approximately one-half hour at 160° F. At the end of one-half hour the D-fraction is added to the contents of the reactor. The glyoxal and formaldehyde could be added separately if desired. The temperature is then raised to 215° F. after which the reaction is continued with the reactor closed for one hour. At the end of one hour the contents of the reactor are cooled to 120° F.

The oil fraction E is prepared in any desired order and preheated to 120° F. Then this separately prepared fraction is added to the contents in the reactor with agitation. The agitation is continued while the temperature is reduced to approximately 70° F. The resulting product is then run through a homogenizer at 2,000 p.s.i.

In D-fraction, either glyoxal alone may be used, or formaldehyde alone may be used, or the two may be replaced with equivalent amounts of trimethylol phenol and/or iso-pentaldehyde.

A further change that can be made in this example is to eliminate the Igepal CO–990 in the C-fraction and the petroleum sulfonate and Igepal CO–430 in the E-fraction, and use an equivalent amount of sodium alginate (e.g. Kelcoloid LFV) in place thereof. The sodium alginate may be used all in one of the fractions, or it may be divided between them.

*Example 10*

This is an example of a colored news ink:

| | Grams |
|---|---:|
| Benzidine Yellow press cake ¹ | 6750 |
| Calcium lignosulfonate (as in Example 1) | 2260 |
| Water | 4000 |
| Igepal CO–990 | 150 |
| Boric oxide | 30 |
| Dicyandiamide | 112 |
| Glycerol monohydroxy stearate (defoamer) | 10 |
| Deodorized kerosene | 3000 |
| Paraffin oil | 1000 |
| Petroleum sulfonate (Amoco AA) | 250 |
| Polyvinylpyrrolidone (PVP) | 125 |
| Igepal CO–430 | 100 |

¹ For a blue news ink substitute Milori Blue press cake and for a red news ink substitute Barium Lithol Red press cake.

The colored pigment and the calcium lignosulfonate are added to a jacketed vessel equipped with an agitator and the mixture is heated to 120° F. The water, Igepal CO–990, boric oxide, dicyandiamide and glyceral monohydroxy stearate are added to the vessel together or in any order and the temperature of the contents is raised to 160° F. and maintained for 30 minutes. The contents are then cooled to 70° F. and the deodorized kerosene, petroleum sulfonate, PVP, and Igepal CO–430 are added and mixing is continued for 15 minutes. The mixture is transferred to a colloid mill, e.g. a Kady mill, and ground therein for 30 to 60 minutes.

The preferred ranges for the main constituents of my conductive ink formulations are as follows (in percent by weight): carbon black or pigment, 4 to 15%; lignosulfonate, 5 to 20%; oil, 15 to 30%; and water, 40 to 55%.

In the foregoing examples, the depth of the inks may be varied by increasing or decreasing the content of carbon black dye or color pigment.

A preferred practice is to use distilled or de-ionized water, especially where the water supply has high hardness.

Among the possible variations in the foregoing examples the sodium lignosulfonate powder may be replaced by the following lignosulfonates of Lignosol Chemicals, Ltd., Canada; calcium lignosulfonate (Lignosol BD); magnesium lignosulfonate (Lignosol ND); ammonium lignosulfonate (Lignosol TSD); and sugar-free sodium lignosulfonate (Lignosol SFX). Likewise, the calcium lignosulfonate 50% solids evaporate may be replaced with the 50% solids evaporates of the following: sodium base sulfite liquor (Lignosol X); magnesium base sulfite liquor (Lignosol N); and ammonium base sulfite liquor (Lignosol TS). The lignosulfonates may be replaced by other lignin materials such as the sodium salt of alkali lignin (e.g. Indulin C. of West Virginia Pulp & Paper).

Each of the foregoing inks is electrically conductive whereas regular news ink is electrically non-conductive. Thus, the resistance of ink made according to Example 1 measured, at 8 volts, 60 cycles A.C. through a sample 1" x 1" x 1" is 81 ohms. The resistance of the same sample measured at 3 volts D.C. is initially 125 ohms, but increase to 400 ohms due to polarization at the electrodes. In other words, the ink behaves as an electrolyte. By way of comparison, the resistance of a sample of a conventional news ink measured at potential of 200 volts on a one cubic inch sample is 92,000,000 ohms. The conductivity of the electrically conductive inks may vary considerably so long as it is sufficient to cause the ink to behave as an electrolyte on application of a D.C. potential.

Having fully described my invention and set forth a number of illustrative examples showing how it may best be practiced, it will be understood that certain changes and variations may be made therein and other examples substituted without departing from the spirit and scope of the invention.

What is claimed as new is:

1. An electrically conductive printing ink comprising by weight from about 4 to 15% of carbon black and from about 5 to 20% of neutralized lignosulfonate intimately dispersed in a vehicle containing from about 40 to 55% by weight of water and from about 15 to 30% by weight of a mineral oil based on the total composition, said vehicle consisting essentially of an oil-in-water dispersion.

2. An electrically conductive printing ink comprising by weight from about 4 to 15% of carbon black and from about 5 to 20% of lignosulfonate intimately dispersed in a vehicle consisting essentially of a dispersion of mineral oil in water in the ratio of approximately two parts by weight of water to one part of oil.

3. An electrically conductive printing ink consisting essentially of by weight from about 4 to 15% of carbon black and from about 5 to 20% of neutralized lignosulfonate intimately dispersed in a vehicle consisting essentially of a dispersion of mineral oil in water, the water being substantially in excess of the oil, said ink containing in addition minor amounts of alkali metal lignosulfonate, neutralized, oil-soluble petroleum sulfonate and a solid surfactant comprising a polyoxyethylated nonylphenal.

4. An electrically conductive printing ink consisting essentially of by weight from about 4 to 15% of carbon black and from about 5 to 20% of neutralized lignosulfonate intimately dispersed in a vehicle consisting essentially of water and a mineral oil, the water being substantially in excess of the oil, said ink containing in addition minor amounts of alkali metal lignosulfonate, neutralized, oil-soluble petroleum sulfonate, a solid surfactant comprising a polyoxyethylated nonylphenal, dicyandiamide, morpholine, boric oxide, glyoxal and formaldehyde.

5. An electrically conductive printing ink containing by weight from about 4 to 15% carbon black, from about 5 to 20% neutralized calcium lignosulfonate, from about 40 to 55% of water, from about 15 to 30% of a mineral oil, and minor percentages of sodium lignosulfonate, neutralized, oil-soluble petroleum sulfonate and a solid surfactant comprising a polyoxyethylated nonylphenal.

6. An electrically conductive ink comprising by weight, about 10% carbon black, about 9% approximately neutral calcium lignosulfonate, about 25% paraffin oil, about 50% water, about 1% sodium lignosulfonate, about 1% neutralized, oil-soluble petroleum sulfonate, and about 4% of solid surfactant comprising a polyoxyethylated nonylphenal.

7. An electrically conductive ink comprising, by weight, about 7% carbon black, about 14% approximately neutral calcium lignosulfonate, about 23% light mineral oil, about 47% water, about 2% dicyandiamide, about 0.4% morpholine, about 1.4% glyoxal, about 0.5% sodium lignosulfonate, about 1.4% neutralized, oil-soluble petroleum sulfonate, about 0.5% formaldehyde, about 0.2% boric oxide.

8. An electrically conductive printing ink consisting essentially of by weight from about 4 to 15% of carbon black and from about 5 to 20% of neutralized lignosulfonate intimately dispersed in a vehicle consisting essentially of water and a mineral oil, the water being substantially in excess of the oil, said ink containing in addition a minor amount of a water soluble alginate as an emulsifier.

9. The method of preparing an electrically conductive printing ink comprising carbon black and lignosulfonate intimately dispersed in a vehicle consisting essentially of an oil-in-water dispersion, comprising, preparing an aqueous dispersion of carbon black and minor amounts of sodium lignosulfonate, morpholine and dicyandiamide, preparing an aqueous dispersion of calcium lignosulfonate and minor amounts of carbon black and dicyandiamide, admixing said aqueous dispersions of carbon black and calcium lignosulfonate, preparing an aqueous dispersion of dicyandiamide and a solid surfactant comprising a polyoxyethylated nonylphenol, agitating said aqueous dispersions for approximately one-half hour at approximately 160° F., adding minor amounts of glyoxal and formaldehyde to the admixture and agitating the admixture for approximately one hour at 215° F. in a closed vessel, cooling the admixture to about 120° F., blending into the cooled admixture mineral oil in an amount equal to approximately one-half of the water in the admixture together with minor quantities of neutralized, oil-soluble petroleum sulfonate, and solid surfactant comprising a polyoxyethylated nonylphenal, and homogenizing the resulting blend.

References Cited in the file of this patent

UNITED STATES PATENTS

| 1,738,798 | Richter et al. | Dec. 10, 1929 |
| 1,860,043 | Ludwigsen | May 24, 1932 |
| 2,525,433 | Voet | Oct. 10, 1950 |
| 2,690,973 | Voet | Oct. 5, 1954 |

OTHER REFERENCES

Ellis: Printing Inks, Reinhold Pub. Co., N.Y., 1940, pp. 330–349, 410.